Figure 10:
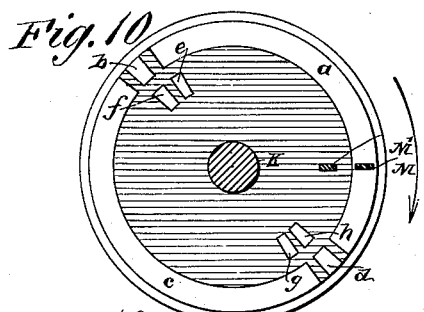

(No Model.) 4 Sheets—Sheet 1.
R. THRELFALL.
ELECTROMAGNETIC RECIPROCATING MOTOR.
No. 509,705. Patented Nov. 28, 1893.
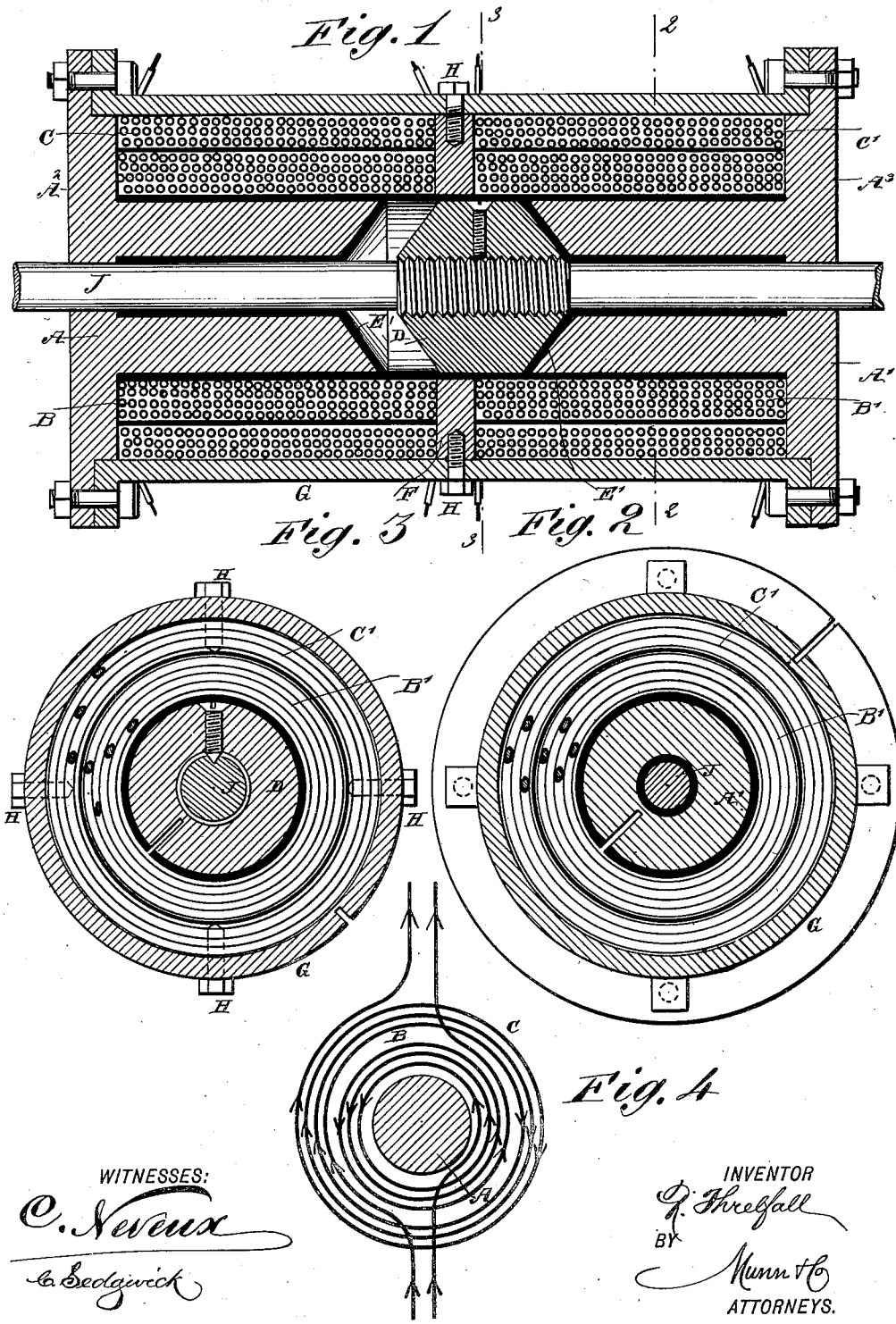

(No Model.) 4 Sheets—Sheet 2.
R. THRELFALL.
ELECTROMAGNETIC RECIPROCATING MOTOR.
No. 509,705. Patented Nov. 28, 1893.
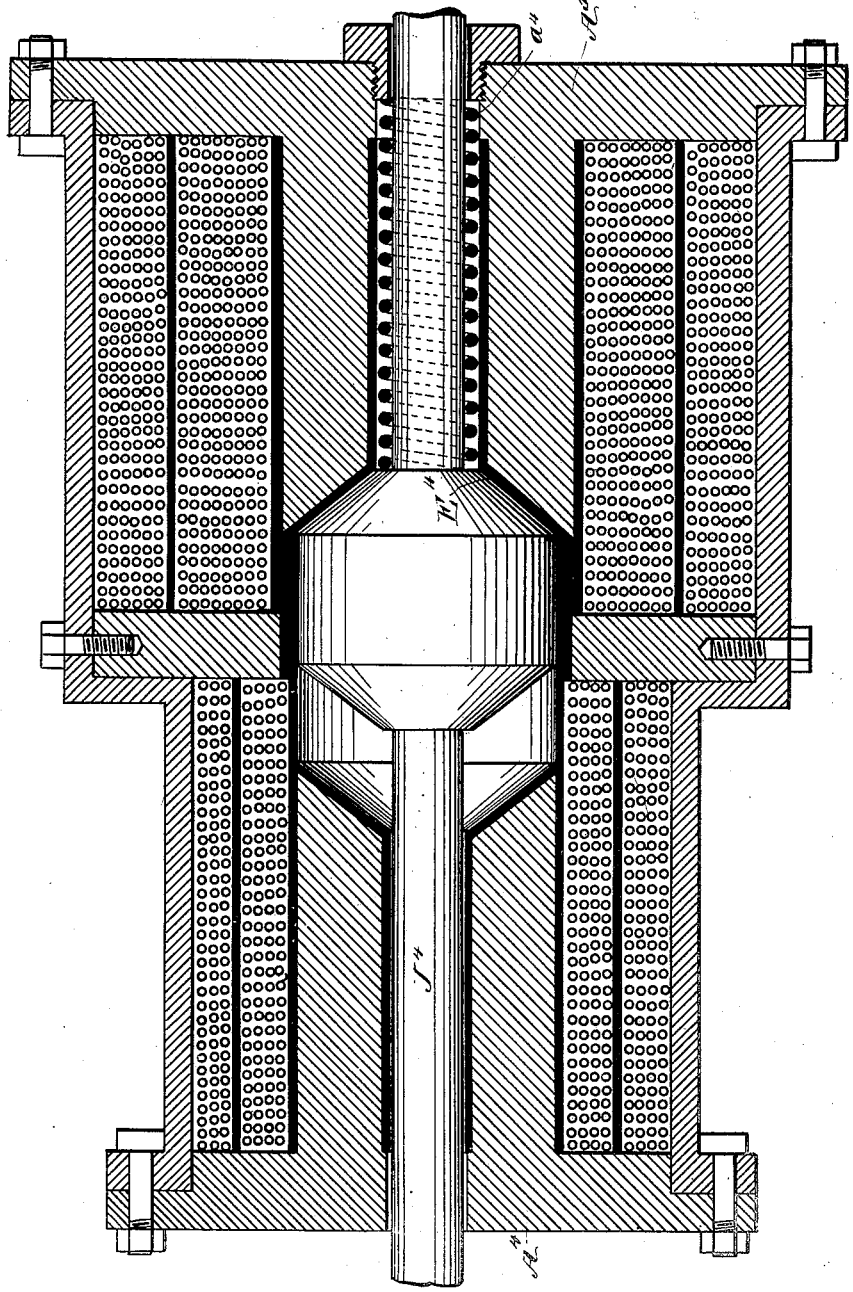
Fig. 1ᵃ
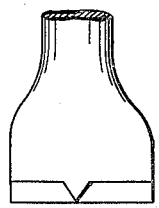
WITNESSES:
C. Neveux
C. Sedgwick
INVENTOR
R. Threlfall
BY
Munn & Co
ATTORNEYS.

(No Model.) 4 Sheets—Sheet 3.
R. THRELFALL.
ELECTROMAGNETIC RECIPROCATING MOTOR.
No. 509,705. Patented Nov. 28, 1893.
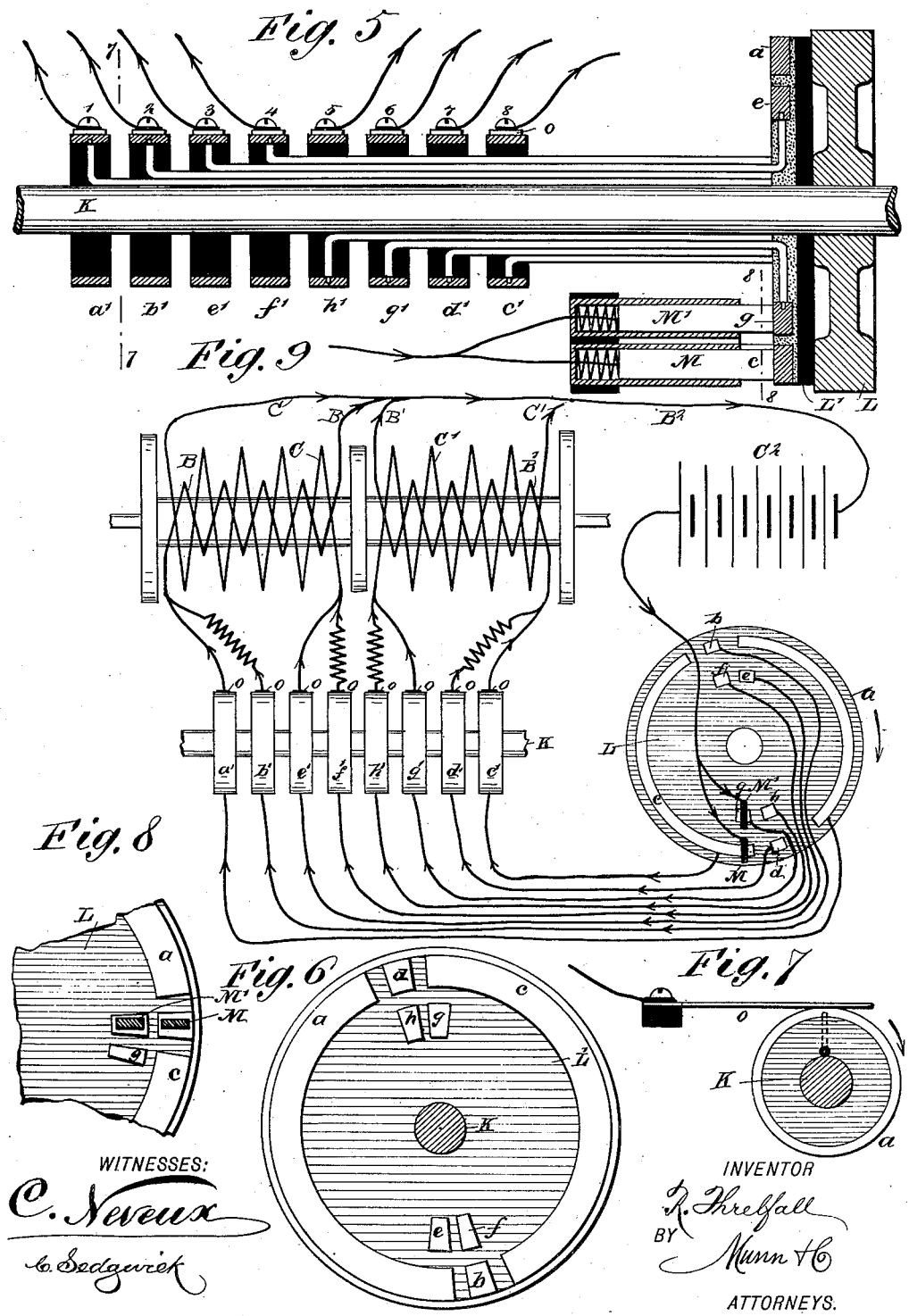
WITNESSES:
C. Neveux
C. Sedgwick
INVENTOR
R. Threlfall
BY Munn & Co
ATTORNEYS.

(No Model.) 4 Sheets—Sheet 4.
R. THRELFALL.
ELECTROMAGNETIC RECIPROCATING MOTOR.

No. 509,705. Patented Nov. 28, 1893.

WITNESSES:
C. Neveux
C. Sedgwick

INVENTOR
R. Threlfall
BY
Munn & Co
ATTORNEYS.

UNITED STATES PATENT OFFICE.

RICHARD THRELFALL, OF SYDNEY, NEW SOUTH WALES.

ELECTRO-MAGNETIC RECIPROCATING MOTOR.

SPECIFICATION forming part of Letters Patent No. 509,705, dated November 28, 1893.

Application filed February 24, 1892. Serial No. 422,658. (No model.)

*To all whom it may concern:*

Be it known that I, RICHARD THRELFALL, professor of physics in the University of Sydney, a subject of the Queen of Great Britain, residing at Bayswater Road, Darlinghurst, Sydney, in the Colony of New South Wales, have invented improvements in electro-magnetic apparatus for producing a reciprocating motion and for supplying intermittent electric currents for that purpose; and I do hereby declare that the following is a full, clear, and exact description of the invention, which will enable others skilled in the art to which it appertains to make and use the same.

My invention consists in an improved form of electric motor, in which the electric current is used to produce a reciprocating or backward and forward motion directly instead of first producing a rotary motion and the same being afterward converted into a reciprocating motion by means of cranks or other mechanical appliances. At the same time, the combined mechanical and electrical efficiency is greater, the parts fewer and more simple in construction, and the friction and consequent wear and tear of the working parts less than in apparatus at present used for the same purpose.

The motor may be used for any appliances which require a reciprocating motion, but, in order to illustrate my invention, I have shown it upon the drawings hereto attached in its simplest form without connection to any special mechanism.

My invention also comprises means for commutating the current which apparatus when connected with any appropriate electric motor allows the latter to be worked without the production of as much sparking as happens with the commutators at present in use. It moreover allows the maximum available impressed electro motive force to be applied from beginning to end of the time of application. The commutator can be used with any dynamo suitably wound or other source of electric current and can be driven separately from the dynamo and therefore at a different speed, thus enabling the motor to be worked at any desired speed independently of the speed of the dynamo.

In the accompanying drawings,—Figure 1 is a longitudinal section of a motor constructed according to my improvement. Fig. 1ª is a longitudinal section of a modified form. Fig. 2 is a cross section taken on line 2—2 in Fig. 1. Fig. 3 is a cross section taken on line 3—3 in Fig. 1. Fig. 4 is a diagram, showing the direction of the current through the winding of the motor. Fig. 5 is a longitudinal section of the commutator. Fig. 6 is a face view of a part of the commutator. Fig. 7 is a side elevation of one of the contact rings. Fig. 8 is a partial face view of a part of the commutator, showing the position of the contact pieces. Fig. 9 is a diagram of the circuits; and Figs. 10 to 17 inclusive, are views of the face of the commutator in different positions during its revolution.

A and A', are the cores of the magnet on which coils B, C, B', C', are wound. The cores are bored axially, and counterbored conically on their inner adjacent ends, and their outer ends are provided with flanges $A^2$, $A^3$. The flanges $A^2$, $A^3$, are bolted to the flanged ends of the wrought iron tube G, which forms a support for the cores A, A', and at the same time acts as a yoke, connecting the outer ends of the magnet cores. To the bore of the cores is fitted a sliding rod J, preferably of non-magnetic material, carrying an armature D, which is internally threaded and screwed upon the threaded portion of the rod J. The armature D is further secured in place by a set screw. The ends of the armature D are made conical to conform to the conically bored ends of the magnet cores A, A'.

The inner ends of the magnet cores A, A', as well as the bore of the cores, for a portion of their length are lined with non-magnetic material, the portion which covers the conical inner ends of the magnet cores forming buffers E, E'. The magnet cores are surrounded by an insulating tube upon which are wound the coils B, B', and upon said coils are wound other coils C, C'. At the middle of the length of the wrought iron tube G is placed a ring F, which separates the coils B, C, from the coils B', C'. The said ring is held in place by tap-bolts H. The armature D, the cores A, A', the ring F, and the soft iron tube G, are all slit longitudinally to prevent eddy currents.

The commutator, which is shown in Fig. 5, is formed upon a shaft K, which is connected with any suitable power. Upon the shaft is mounted a disk L, carrying an insulating plate L', to which are attached contact pieces a, b, c, d, e, f, g, h, and upon the shaft are mounted insulated contact rings a', b', e', f', h', g', d', c'. The contact piece a on the insulating plate L' is connected with the contact ring a'; the contact piece b is connected with the contact ring b'. In a similar manner the contact piece c is connected with the contact ring c', d with d', e with e', f with f', g with g' and h with h'.

The terminals of the coils B, B, C', C', are connected with springs o bearing on the contact rings a', b', &c., in the following order: One terminal of the coil B is branched and one part is connected with the spring of the contact ring a'; the other part of the branch of the said terminal is connected through resistance with the spring of the contact ring b'. The other terminal of the coil B is connected with the wire $B^2$ leading to one terminal of an electric generator $C^2$. One terminal of the coil C is branched, and one part of the branch is connected with the spring belonging to the contact ring e', while the other part of the branch is connected through resistance with the spring of the contact ring f'. The other terminal of the coil C is connected with the wire $B^2$ leading to the generator. The terminal connections with the contact rings of the coils B, C, are oppositely arranged with respect to each other, that is to say, the connections of the coil B are attached to the outer end, while the said connections of the coil C are attached to the inner end thereof. In a similar manner the coil B' is connected with the springs of the contact rings d', c', the connection of the ring d' being through resistance. The remaining terminal of the said coil B' is connected with the wire $B^2$ leading to the generator. In like manner the coil C' is connected with the contact rings h', g', the connection with the contact ring h' being through resistance. The remaining terminal of the coil C' is connected with the wire $B^2$ leading to the generator $C^2$. The remaining pole of the generator is connected by a wire with brushes M', M, which press upon the contact pieces a, b, c, as the plate L' revolves.

Figure 11:
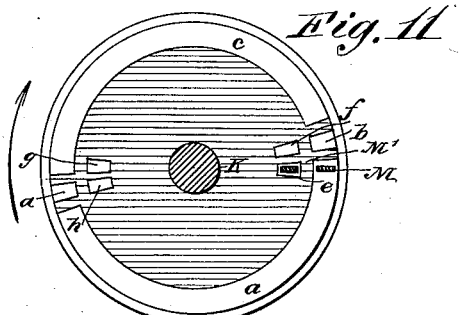
Figure 12:
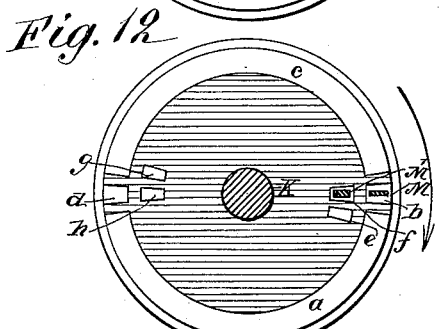
Figure 13:
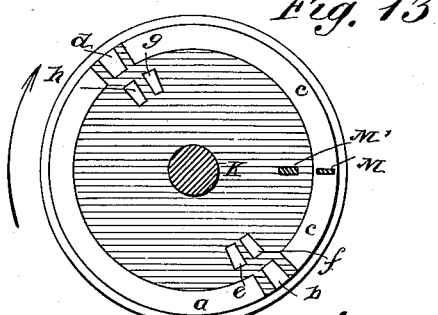
Figure 14:
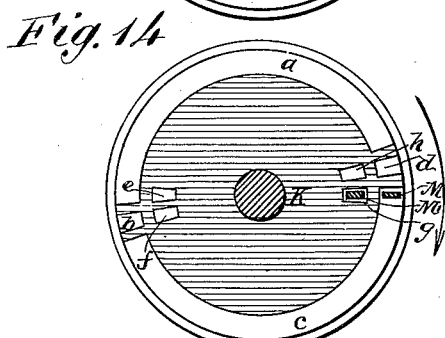
Figure 15:
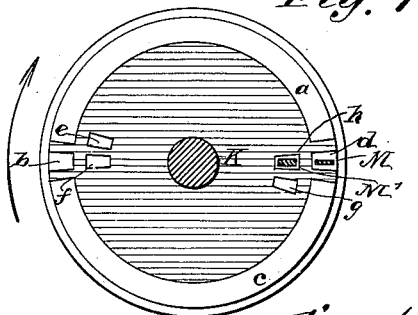

The following is the cycle of the operations of my improved motor: With the brush M on the contact piece a, the brush M' being out of contact, the current flows through the magnetizing coil B, energizing the magnet A, causing the armature D to be drawn away from its position, as shown in the drawings, the position of the parts under these circumstances being shown in Fig. 10. A further movement of the contact pieces in the direction indicated by the arrow, brings the brush M' into contact with the contact piece e, while the brush M is still upon the contact piece a, as shown in Fig. 11, when the current in the demagnetizing coil C opposes the current in the coil B, destroying or weakening the action of the said coil on the magnet core. The further movement of the contact pieces in the direction of the arrow brings the brush M into connection with the contact piece b, while the brush M' touches the contact piece f, as shown in Fig. 12. Under these circumstances the current passes through the resistances, and thus diminishes the strength of the current in both the magnetizing and demagnetizing coils. A further movement of the contact pieces in the same direction brings the contact piece c under the brush M, when the current in the magnetizing coil B' energizes the magnet core A', causing the armature D to be returned to its original position, the brush M' being at this time out of electrical contact, as shown in Fig. 13. A further movement of the contact pieces with the brush M still on the contact piece c, brings the contact piece g under the brush M', as shown in Fig. 14, when the current in the demagnetizing coil C' opposes the action of the current in the magnetizing coil B, when the magnetism in the core A' is destroyed or weakened. When the further revolution of the contact pieces brings the contact piece d under the brush M, and also brings the contact piece h under the brush M', the current passes to the coils as before, but through the resistances, thus reducing the current in the coils. The revolution is now complete and the cycle of operations re-commences.

Figure 16:
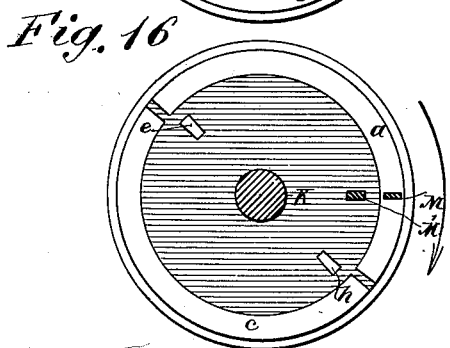
Figure 17:
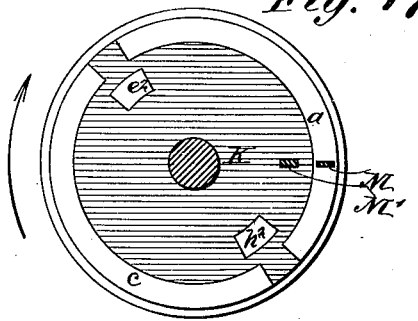

The following modification illustrated by Figs. 16 and 17 would be advantageous in some cases. In the case of Fig. 16, the contact piece a would pass under the brush M while the brush M' would be out of contact, and while the brush M is still upon the contact piece a, the brush M' would contact with the contact piece e, closing the demagnetizing circuit in itself without including the source of the current. What happens at this side of the commutator is repeated upon the other side. In the arrangement shown in Fig 17, the contact pieces $e^2$ and $h^2$ overlap the spaces between the contact pieces a, c, thus preventing any absolute break of the circuit.

By the above arrangement of the contact pieces and brushes, the currents in the magnetizing circuits are never reduced or transferred from one circuit to the other, without the corresponding demagnetizing circuit being closed and including the source of electromotive force tending to create a current in the opposite direction, or in one alternative arrangement simply closed upon itself. The object of the above arrangements besides the distribution of current to the magnetizing or driving circuits is twofold; first the diminution of sparking at the commutator; second, the rapid destruction of the magnetization of the magnet which has done its work. The sparking of a commutator depends partly on the current which is flowing at the moment the circuit is broken, and partly on the voltage acting in the circuit. This latter is to be considered as made up of the impressed voltage and the voltage due to the self induction of the magnets. The secondary or demagnetizing circuit acts in preventing sparking in two ways. If the demagnetizing current has attained to any appreciable value before the resistance is inserted in the driving circuits, the magnetism may have partially disappeared and consequently the self induction before the resistance is inserted will have diminished. In large mechanisms, however, the "time constants" are usually large, and if the period of oscillation of the tool bar is comparable with the time constant, this effect of the demagnetizing circuit will be of small advantage, because the first reaction effect of a demagnetizing current is to increase the magnetizing current, the demagnetizing current being itself proportionately delayed, so that in some cases the actual result of introducing a demagnetizing current may be to increase the sparking as far as this is concerned. In an apparatus where the time constant is small compared with the period of oscillation, the demagnetizing current will have destroyed the magnetism before the resistance of the circuit is increased, and in this case the effect of the demagnetizing circuit will be beneficial in stopping sparking for this reason. The second mode of action of the demagnetizing circuit depends on the lag of the demagnetizing brush, which always keeps the demagnetizing circuit closed while changes are being made in the magnetizing circuit. In accordance with known principles, the re-action of the two circuits is such that instead of there being a large voltage of self induction to produce a spark, the energy passes over to the demagnetizing circuit, giving rise to a voltage which opposes the impressed voltage, or if the circuit is closed, produces or tends to produce a current in it, tending to keep the magnetic state constant. This operates both when the resistance is inserted and when the current is transferred from one magnet to the other. It is now clear how the demagnetizing circuit acts in preventing sparking, and it is obvious without further explanation that when the magnet A' begins to be magnetized, the magnet A has the decay of its magnetism accelerated by the action of the lagging current in the demagnetizing circuit. The lag must, of course, not be great enough to allow the current to re-magnetize the iron, but as the allowable lag depends upon the time constant of the apparatus, and this on the particular mode of winding selected, it is clear that the exact amount of lag will have to be calculated to meet each separate case.

The slots in the casing, ring, limbs of magnets, and armature, for the purpose of preventing eddy currents are saw-cuts, made, as far as practicable, without injuring the mechanical stability of the apparatus. By thus avoiding the formation of eddy currents, the rate at which the magnetism can be dissipated is increased. The rate at which the magnetism can be got rid of is a very important factor in the success of these machines, and it is only by the use of a counter electromotive force in the demagnetizing circuit that the condition of high rate of dissipation can be complied with simultaneously with the production of only a moderate degree of sparking. Such sparks as exist in spite of these precautions are best blown out as they arise, by an ordinary magnetic or other blow-out.

In order that the demagnetizing coils C C' should be able to accomplish their purpose, it is essential that the contact pieces e g should be large enough to allow of the current rising to a sufficient strength before the brush slides on to the pieces f and h. Should the time constant of the circuit prove so great as to require the contact pieces e and g to be too large for convenience, the time constant must be reduced either by increasing the electromotive force of the source of electricity, and adding inductionless resistance, or in any other suitable manner. I have found contact pieces of the proportions shown in Fig. 5 to give satisfactory results, although, theoretically, the exact proportions depend upon the speed of rotation of the commutator, mode of winding, self induction, and resistance of the whole circuit, and hence have to be adjusted in the construction of different apparatus. The mode of winding depends upon the amount of current which can be suitably commutated. For a machine wound for one hundred volts, I use four hundred to six hundred and sixty turns of .09 inch insulated copper wire on the magnetizing circuit of each magnet, and half this amount on the demagnetizing circuits.

The apparatus described is suitable for application where the resistance to motion of the tool bar is the same whether it be going forward or backward. In an application to a rock drill or hammering mechanism, however, all the useful work is done at the end of the stroke in one direction only, and consequently if it be desired to keep the speed of oscillation high and yet not waste the energy of the return or backward movement, the mechanism must be provided with a spring, $a^4$, as shown in Fig. 1ª which is compressed during the return stroke. This involves a modification of the winding of one set of magnets, for it is clear that the return stroke when the bar is compressing the spring will take longer than the forward stroke when the spring is helping the magnets to move the bar. A good arrangement of winding for this purpose is to place twice as many turns of wire on the core $A^5$ which pulls the armature against the spring as on the core $A^4$ whose action is helped by the spring. The contact piece of the commutator connected with the driving circuit of the magnet with the double number of turns is twice as long as the contact piece connected with the driving circuit of the magnet with fewer turns, so that during one revolution of the commutator, the current is flowing in the circuit of more turns twice as long as in the circuit of fewer turns. With a given voltage, negligible external resistance and neglecting small corrections, it will be found that with the above described arrangement, the energy spent on both magnets will be the same during any complete vibration of the tool bar, provided that currents never rise to more than a small fraction of their steady value. If the two magnets are equally wound and the commutator equally divided, it will be found that the action of the spring is to stop the working of the motor entirely when the commutator speed exceeds a certain value. The contrivance of different windings, &c., for the circuits may therefore be regarded as a device for enabling a percussion tool to be driven at a higher rate of speed than could be obtained with the simpler mode of winding.

The circuits are provided with resistances adjustable by hand by any of the well known approved methods, so that when the mechanism is first set in action the current may be kept below the amount necessary to make the machine take its full stroke. The reciprocating portions will then merely oscillate slightly about their mean positions. In the case of an application to a rock drill at all events this is an advantage, as it enables the miner to get touch of a rock face before he throws on the full power of the drill.

As many mechanisms as may be desired to be used with the same generator or commutator may be connected by joining the circuits of each mechanism to the appropriate contact pieces of the commutator and terminal of the generator, so that the corresponding circuits of each mechanism are in parallel with each other; or the corresponding circuits might be in series for the purpose of saving wire, though this arrangement will usually and perhaps invariably be less effective than the other. In case more than one mechanism is employed, it will be most convenient to use a constant pressure generator.

Having thus described my invention, I claim as new and desire to secure by Letters Patent—

1. In electro-magnetic apparatus for producing reciprocating motion, a bi-polar electro-magnet provided with both magnetizing and demagnetizing coils on each polar extremity, and a rotary commutator provided with four sets of contacts, two for each end of the magnet, for controlling the current passing through the magnetizing and demagnetizing coils, substantially as specified.

2. In an electro-magnetic apparatus for producing reciprocating motion directly, the combination in a rotary commutator, of the contact pieces $a, b, c, d, e, f, g, h$, arranged on the face of the commutator disk, the brushes M, M' connected with the current supply, the contact rings $a', b', c', d', e', f', g', h'$, connected with the contact pieces $a, b, c, d$, &c., and the magnet provided with magnetizing coils B, B' and demagnetizing coils C, C', substantially as specified.

3. In an electro-magnetic apparatus for producing reciprocating motion directly, the combination of the tubular cores A, A' having conically bored faces, the magnetizing coils B, B' placed on the tubular cores and forming a bi-polar electro-magnet, the demagnetizing coils C, C' wound upon the magnetizing coils B, B', the armature D having conical ends, the rod J carrying the armature, and the casing G attached to the tubular cores, substantially as specified.

In testimony that I claim the foregoing as my invention I have signed my name, in the presence of two witnesses, this 14th day of December, 1891.

RICHARD THRELFALL.

Witnesses:
 ALFRED DE LISSA,
  *Solr., Sydney.*
 LORIMER E. HAREUS,
  *Clerk to Mr. De Lissa, Sydney.*